United States Patent
Leordeanu et al.

(10) Patent No.: US 10,586,321 B2
(45) Date of Patent: Mar. 10, 2020

(54) AUTOMATIC DETECTION, COUNTING, AND MEASUREMENT OF LUMBER BOARDS USING A HANDHELD DEVICE

(71) Applicant: Fordaq SA, Brussels (BE)

(72) Inventors: Marius Leordeanu, Bucharest (RO); Vlad Licaret, Bucharest (RO); Tudor Buzu, Bacau (RO); Iulia-Adriana Muntianu, Bacau (RO); Catalin Mutu, Bucharest (RO)

(73) Assignee: Fordaq SA, Brussels (BE)

( * ) Notice: Subject to any disclaimer, the term of this patent is extended or adjusted under 35 U.S.C. 154(b) by 134 days.

(21) Appl. No.: 15/854,500

(22) Filed: Dec. 26, 2017

(65) Prior Publication Data

US 2018/0182088 A1    Jun. 28, 2018

Related U.S. Application Data

(60) Provisional application No. 62/439,437, filed on Dec. 27, 2016, provisional application No. 62/576,442, filed on Oct. 24, 2017.

(51) Int. Cl.
    *G06T 7/12*                (2017.01)
    *G06T 7/00*                (2017.01)
    (Continued)

(52) U.S. Cl.
    CPC .............. *G06T 7/0004* (2013.01); *G06T 7/12* (2017.01); *G06T 7/13* (2017.01); *G06T 7/60* (2013.01);
    (Continued)

(58) Field of Classification Search
None
See application file for complete search history.

(56) References Cited

U.S. PATENT DOCUMENTS

| | | | | |
|---|---|---|---|---|
| 5,307,294 | A | * | 4/1994 | Aman .................. G01B 11/002 702/128 |
| 5,415,518 | A | * | 5/1995 | Montgomery ......... B65G 61/00 414/791.6 |

(Continued)

OTHER PUBLICATIONS

PCT International Search Report and Written Opinion, PCT Application No. PCT/IB2017/001708, dated Apr. 12, 2018, 15 pages.

(Continued)

*Primary Examiner* — Fayyaz Alam
(74) *Attorney, Agent, or Firm* — Fenwick & West LLP

(57) ABSTRACT

An image processing system receives an image depicting a bundle of boards. The bundle of boards has a front face that is perpendicular to a long axis of boards and the image is captured at an angle relative to the long axis. The image processing system applies a homographic transformation to estimate a frontal view of the front face and identifies a plurality of divisions between rows in the estimate. For each adjacent pair of the plurality of divisions between rows, a plurality of vertical divisions is identified. The image processing system identifies a set of bounding boxes defined by pairs of adjacent divisions between rows and pairs of adjacent vertical divisions. The image processing system may filter and/or merge some bounding boxes to better match the bounding boxes to individual boards. Based on the bounding boxes, the image processing system determines the number of boards in the bundle.

20 Claims, 15 Drawing Sheets

(51) Int. Cl.
*G06T 7/60* (2017.01)
*G06T 7/13* (2017.01)

(52) U.S. Cl.
CPC ............... *G06T 2207/30068* (2013.01); *G06T 2207/30161* (2013.01); *G06T 2207/30242* (2013.01)

(56) References Cited

U.S. PATENT DOCUMENTS

| | | | |
|---|---|---|---|
| 6,741,275 B2* | 5/2004 | Frigon | G01B 11/245 348/91 |
| 2015/0206188 A1* | 7/2015 | Tanigawa | G06Q 30/0261 705/14.58 |
| 2016/0224857 A1* | 8/2016 | Zhang | G06K 9/00771 |
| 2019/0172039 A1* | 6/2019 | Kambara | G07G 1/00 |

OTHER PUBLICATIONS

Jubair, M.I. et al., "A Technique to Detect Books from Library Bookshelf Image," 2013 IEEE 9$^{th}$ International Conference on Computational Cybernetics (ICCC 2013), IEEE, Jul. 8-10, 2013, pp. 359-363.

* cited by examiner

# AUTOMATIC DETECTION, COUNTING, AND MEASUREMENT OF LUMBER BOARDS USING A HANDHELD DEVICE

CROSS REFERENCE TO RELATED APPLICATIONS

This application claims the benefit of U.S. Provisional Application No. 62/439,437, filed Dec. 27, 2016, and U.S. Provisional Application No. 62/576,442, filed Oct. 24, 2017, both of which are incorporated by reference in their entireties.

TECHNICAL FIELD

The disclosure generally relates to the field of inventory management, and in particular to automatically counting and measuring boards using an image captured using a handheld device.

BACKGROUND

The technical challenges for counting lumber boards, using automated computing and an image from a camera are numerous. For example, there may be variations in illumination, viewpoint, scale (distance between camera and bundle), board size, board shape, and board texture as well as blurring, shadows, distractors (e.g., marks written on lumber), and other irregularities in appearance and structure.

To account for the large number of variations, existing systems for automated board counting rely on mounting systems with fixed cameras and illumination. Such systems provide a highly-controlled environment for image capture. While these systems are effective, they are expensive to configure and operate. Moreover, additional resources are necessary to position the boards precisely so that the boards can be properly imaged by the camera within the mounting system, which may be time consuming.

Handheld devices with cameras are now commonly available. For example, many people now carry smartphones that include a camera. However, images captured using such devices may be more susceptible to the types of variations described above that make automated analysis difficult. Hence, mobile devices with cameras are ineffective in addressing such challenges.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
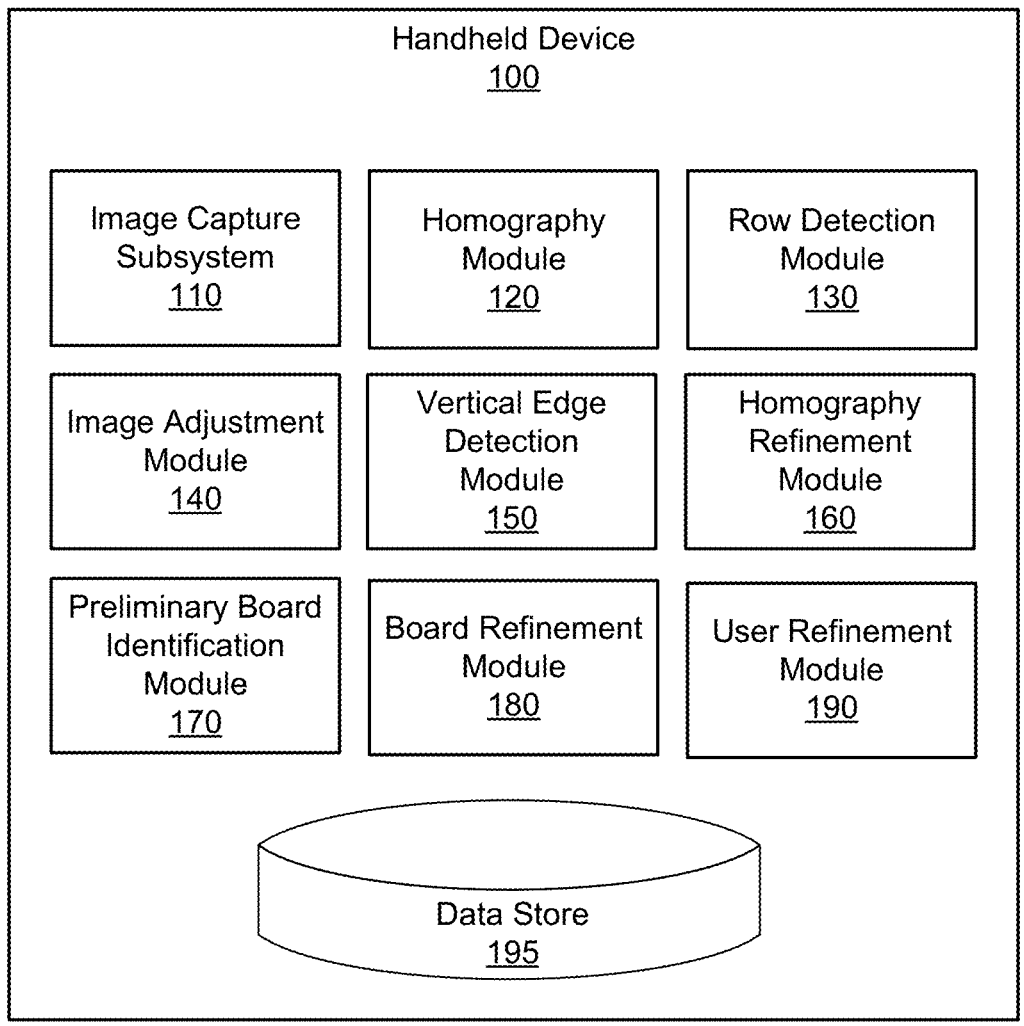
FIG. 1 illustrates a handheld device for detecting, counting, and measuring boards, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An apparatus (and corresponding method and computer program product) is disclosed for automatically (or semi-automatically) identifying, counting, and measuring the boards in a bundle. An example of an apparatus is a handheld devices, e.g., smartphone or tablet, having a built in camera.

The boards are typically lumber. Conventional lumber is of wood origin and is comprised of individual pieces of lumber having long lengths, but relatively small width and height. Multiple individual pieces of lumber may be arranged in a bundle. A bundle may allow for easier handling of the multiple individual pieces, e.g., for shipment and/or storage. Although described in the context of lumber, it is noted that the principles noted herein also may be applied to bundles made of any material, such as plastic, particle board, steel, or the like.

In an example embodiment, a user captures an image of the bundle using the handheld device. In an ideal scenario, the image would be captured from a perfect frontal perspective, i.e., viewing the boards end on. However, the reality of using a handheld device is that this is unlikely to be the case in real world applications. The handheld device (or a remote computing device) may account for this by applying a homographic transformation to generate an estimate of the frontal perspective. This is based on the assumption that the frontal face of the bundle is a two-dimensional (2D) plane in the three-dimensional (3D) world. Although this assumption may not be completely accurate, it is a valid approximation in most instances.

Through use of the camera on the handheld device, the handheld device is configured to identify the rows of lumber using a horizontal projection of the transformed image and identifies vertical divisions in each row using a vertical projection. The divisions between rows and the vertical divisions define rectangular bounding boxes that may correspond to a board (or part of a board), a gap between boards, or some either entity or artifact. The handheld device (or a remote computing device) filters the bounding boxes to identify those that correspond to boards (e.g., by removing boxes that correspond to portions of the image that are not close in color to the boards). Some or all of the bounding boxes below some threshold size may be merged with one or more adjacent bounding boxes. This can reduce the effects of vertical divisions that correspond to marks on the board or other artifacts rather than the edge of a board.

In some embodiments, a reference object (e.g., a rhombus with distinctive labels in each of the four corners) is placed on or near the bundle of boards prior to the image being captured. This reference object can aid in determining the appropriate homographic transformation to apply to accurately approximate the frontal view of the bundle of boards.

The disclosed apparatus (and corresponding method and computer program product) provide several advantages. For example, by using a handheld device, the bundle does not need to be moved from a storage location or mounted in any kind of measuring equipment. The user may take the device to the boards and capture an image. Furthermore, the use of the homographic transformation means that the user needs only minimal training as the image does not need to be from a precise location or angle, subject to particular lighting conditions, or the like. In addition, a substantial amount of time may be saved as the majority of the counting and measuring is done automatically.

For example, in one embodiment, the user only has to take the initial image and then check the identified bounding boxes. The user may make a few minor adjustments to the bounding boxes (e.g., using a touchscreen on the device) but the rest of the process is automated. In some embodiments, the process may even be entirely automated (e.g., bundles may be automatically photographed as they are brought into a warehouse and an estimated count and set of measurements appended to a record of the inventory stored in the warehouse). One of skill in the art may recognize other variations that may be adopted without deviating from the spirit or scope of what is disclosed.

Example Board Detection, Counting, and Measurement System

FIG. (Figure) 1 illustrates an example embodiment of a handheld device 100 configuration for detecting, counting, and measuring boards (e.g., lumber boards). In the embodiment shown, the handheld device 100 includes an image capture subsystem 110, a homography module 120, a row detection module 130, an image adjustment module 140, a vertical edge detection module 150, a homography refinement module 160, a preliminary board identification module 170, a board refinement module 180, a user refinement module 190, and a data store 195. In other embodiments, the handheld device 100 may include different and/or additional elements. In addition, the functions may be distributed among the elements in a different manner than described.

The image capture subsystem 110 includes a physical image capture component as well as software and/or firmware for controlling the image capture device. In one embodiment, the handheld device 100 is a smartphone and the image capture component is a digital camera of the smartphone. In operation, a user points the camera at a bundle of boards and provides user input instructing the camera to capture an image (e.g., by touching a "capture image" button on a touchscreen of the smartphone). The image capture subsystem 110 captures an image of the bundle of boards and stores the image (e.g., in the data store 195). The image capture subsystem 110 may also store metadata, such as the current date and time, the current location (e.g., GPS data), the identity of the user, an identifier of the handheld device 100, and/or other such metadata.

Figure 2:
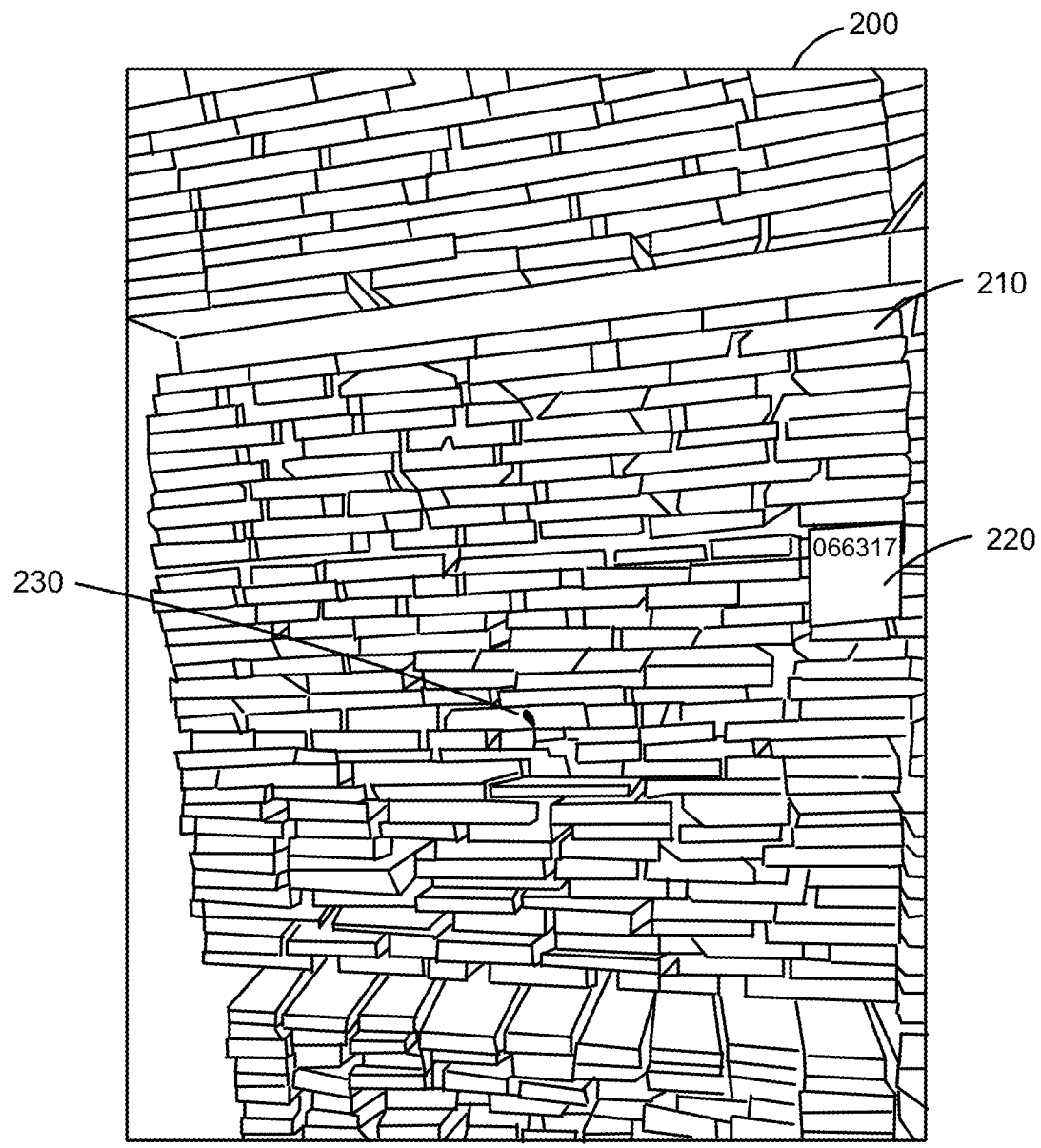
FIG. 2 is an illustrative representation of an image of a bundle of boards, according to one embodiment.

FIG. 2 is an illustrative representation of an image 200 captured by the image capture subsystem 110, according to one example embodiment. The image includes a bundle of boards 210. The image 200 may also include defects and obstructions, such as identifying labels attached to the boards 220, markings on the board 230, and the like. In an ideal scenario, the image 200 would be taken from a frontal viewpoint (i.e., parallel to the long axis of the boards). However, while the image 200 was taken from a near-frontal viewpoint, there is a significant angle between the direction to the viewpoint from the face of the bundle of boards 210 and the long axis of the boards (e.g., 15 degrees). As can be seen from FIG. 2, the boards in the bundle 210 have a variety of widths and there are a range of spaces between adjacent boards.

Referring again to FIG. 1, the homography module 120 takes an image of a bundle of boards from a near-frontal viewpoint (e.g., image 200) as input and determines an initial homographic transformation that will estimate the true frontal viewpoint from the image. In one embodiment, the homography module 120 presents the image to a user (e.g., on a screen of the handheld device 100). The user identifies the bundle of boards 210 in the image, such as by clicking on each of the four corners of the bundle, tracing the bundle's outline on a touch screen, or the like. If the image were a true frontal representation, the outline would be rectangular. However, because the image is likely taken from an angle, the outline may be a less regular quadrilateral.

Figure 3:
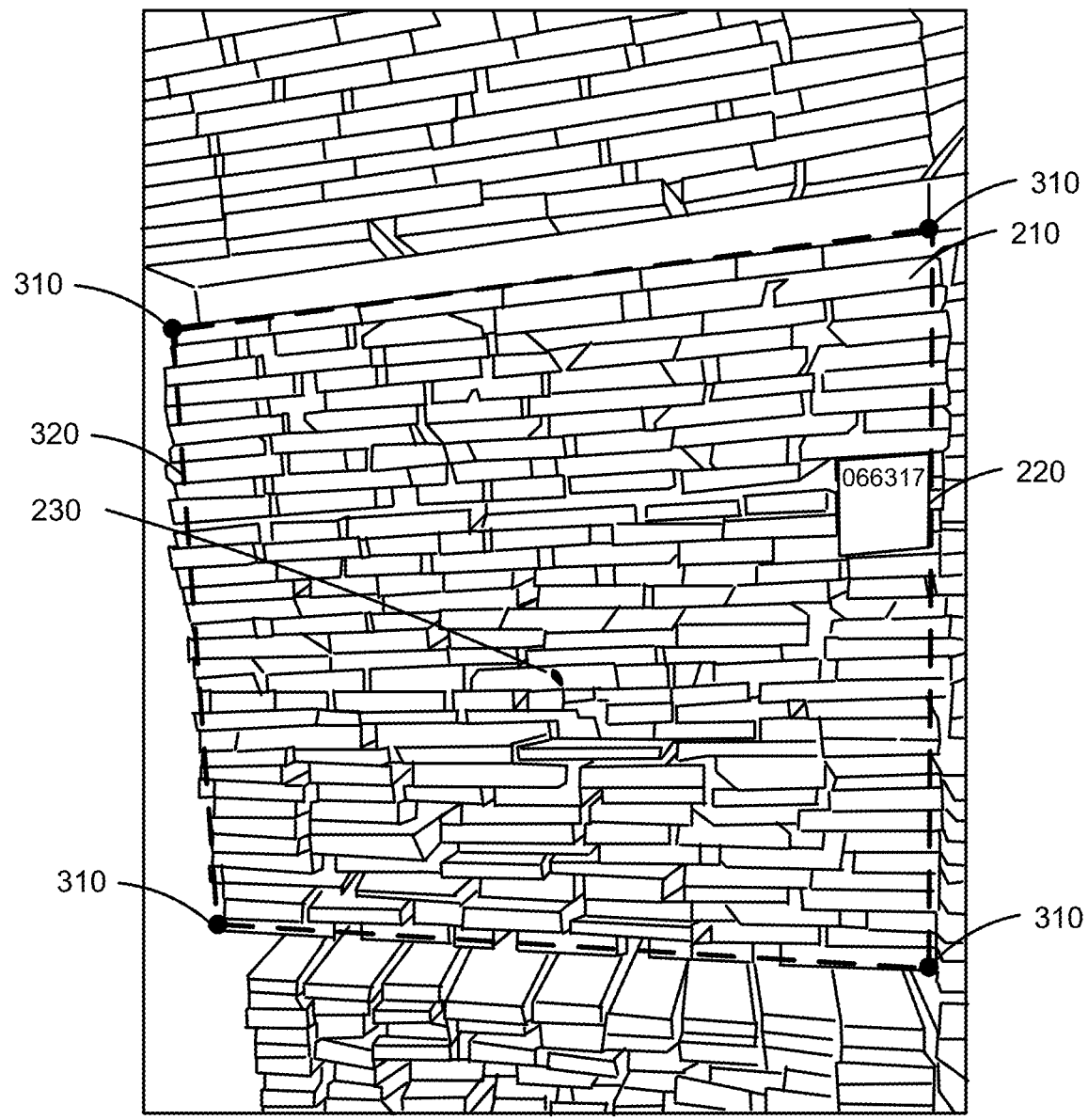
FIG. 3 is an illustrative representation of the image shown in FIG. 2 with a selected bundle of boards highlighted, according to one embodiment.

FIG. 3 shows the image 200 of FIG. 2, after the user has identified the bundle of boards 210, according to one embodiment. Each corner selected by the user may be highlighted with a corner indicator 310 (in the embodiment shown, a circle overlaid on the image) and the quadrilateral defined by the corner may also be highlighted with a quadrilateral indicator 320 (in the embodiment shown, a dashed line joining the corners). In some embodiments, the user may alter the defined quadrilateral after initially setting the corners (e.g., by clicking and dragging a corner indicator 210 or a side of the quadrilateral indicator 220 to another location within the image).

Referring again to FIG. 1, once the quadrilateral bounding the bundle of boards 210 has been defined, the homography module 120 uses it to determine the initial homographic transformation that approximates the true frontal view. In one embodiment, the homography module 120 takes the quadrilateral and determines a bijective map that transforms the quadrilateral into a rectangle. This bijective map is used to apply the initial homographic transformation to the image to create an estimate of the true frontal view. As the bijective map is based on user input, it may be an approximation of the true global homographic transformation. The homography module 120 may also crop the image such that only the frontal face of the bundle of boards is shown. An alternative embodiment in which a physical reference object is used to calculate the bijective map is described below, with reference to FIGS. 10 through 13.

Figure 4:
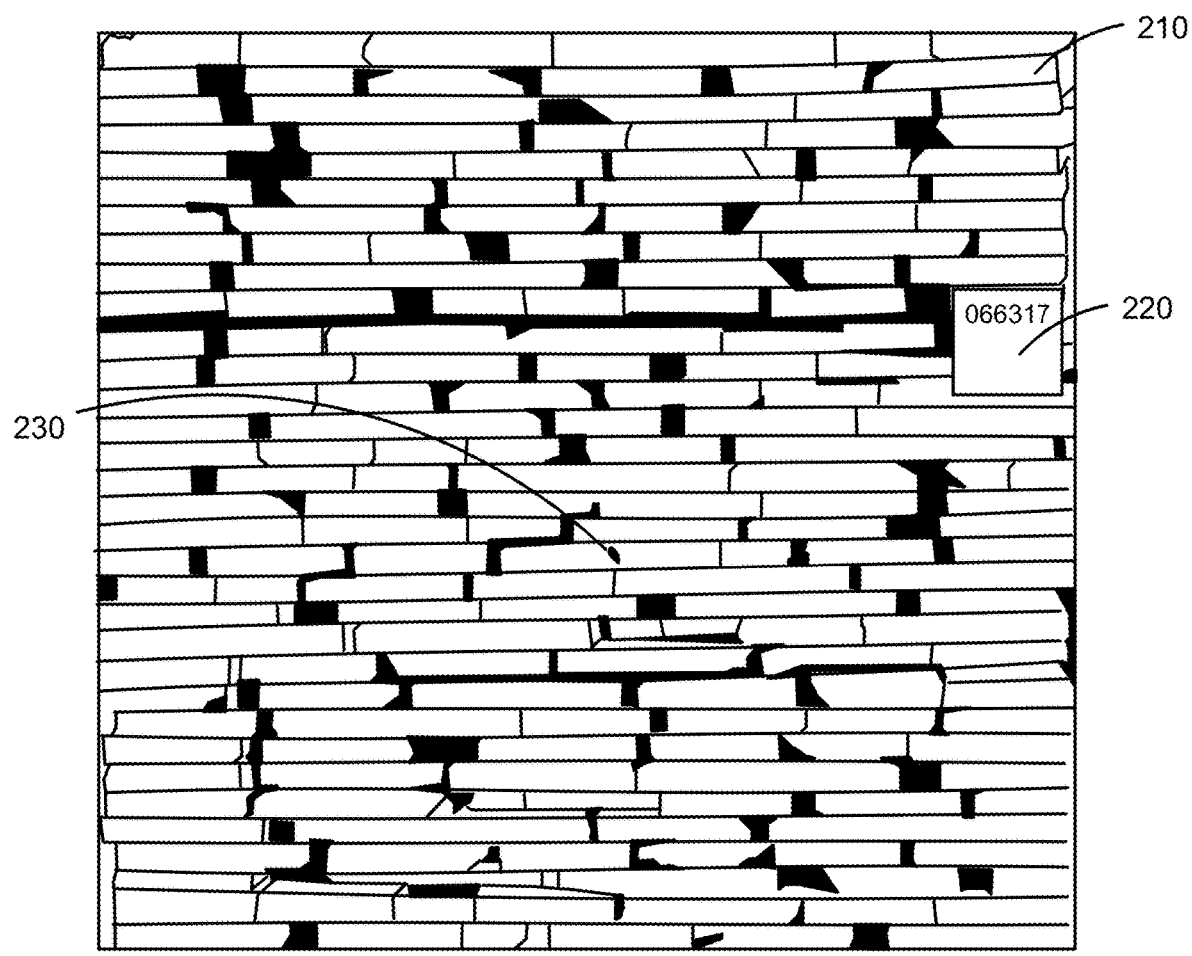
FIG. 4 is an illustrative representation of the image shown in FIG. 2 after application of a homographic transformation and image cropping, according to one embodiment.

FIG. 4 shows the image 200 of FIG. 2 after the homography module 120 has applied the initial homographic transformation and cropped the image, according to one embodiment. As shown in FIG. 4, the resulting image 200 may be an approximation of the frontal face of the bundle 210 in which the spaces between boards are visually apparent. In other words, an approximation of what the bundle 210 would look like if the image were captured from directly in front of the bundle.

Figure 5:
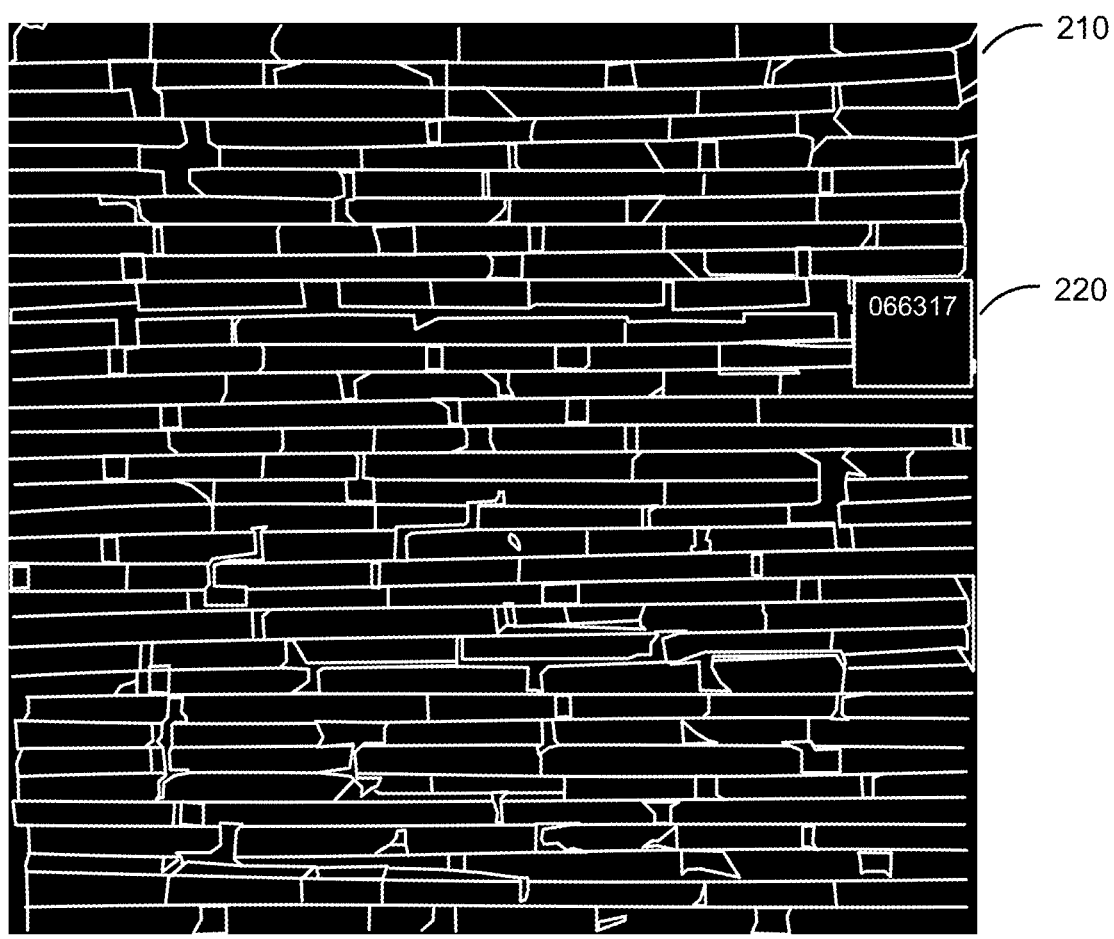
FIG. 5 is an illustrative representation of an edge map of the image shown in FIG. 4 after application of the Sobel operator, according to one embodiment.

Referring once again to FIG. 1, the row detection module 130 detects the rows of boards of the bundle in an image (e.g., image 200). In one embodiment, the row detection module 130 applies the Sobel operator to the image 200 to identify edges (i.e., high-frequency changes in pixel intensity). An example of the result from applying the Sobel operator to the image 200 to generate an edge map is shown in FIG. 5. The intensity of each pixel may correspond to the gradient in intensity at that point. As shown in FIG. 5, areas where the intensity gradient is high (e.g., the outline of boards, the edges of markings on the boards, the edges of objects partially obscuring boards, and the like) have a high intensity and are thus white or light gray. Conversely, areas where the intensity gradient (e.g., the body of boards absent markings, large spaces between boards, the body of objects partially obscuring boards, and the like) have a low intensity and are thus black or dark gray. Note that the identifying label 220 and the marking 230 have also generated edges when the Sobel operator is applied. In other embodiments, other processes are used to identify edges in the image 200.

Regardless of the specific process used to identify the edges in the image 200, the row detection module 130 detects divisions between rows based on a pattern of horizontal edges. Long, substantially horizontal edges may indicate the boundary between two rows of boards in the bundle 210. In one embodiment, the row detection module 130 accumulates the total edge response for each row of pixels in the image 200, referred to as the hline values. For a given row, the hline value may be the sum of the gradient magnitude values for the pixels in that row. In other words, an hline value is a horizontal projection of the corresponding row.

The row detection module 130 may also apply additional processing to the hline values, such as smoothing the results with a Gaussian filter. The division between rows of boards can then be identified as any peak that exceeds a row division threshold. The row division threshold may be a fixed value, configurable by the user, or automatically adapted (e.g., based on an average peak height). In one embodiment, the threshold the row detection module 130 sets the threshold adaptively to be half the magnitude of the maximum peak in the current histogram.

Figure 6:
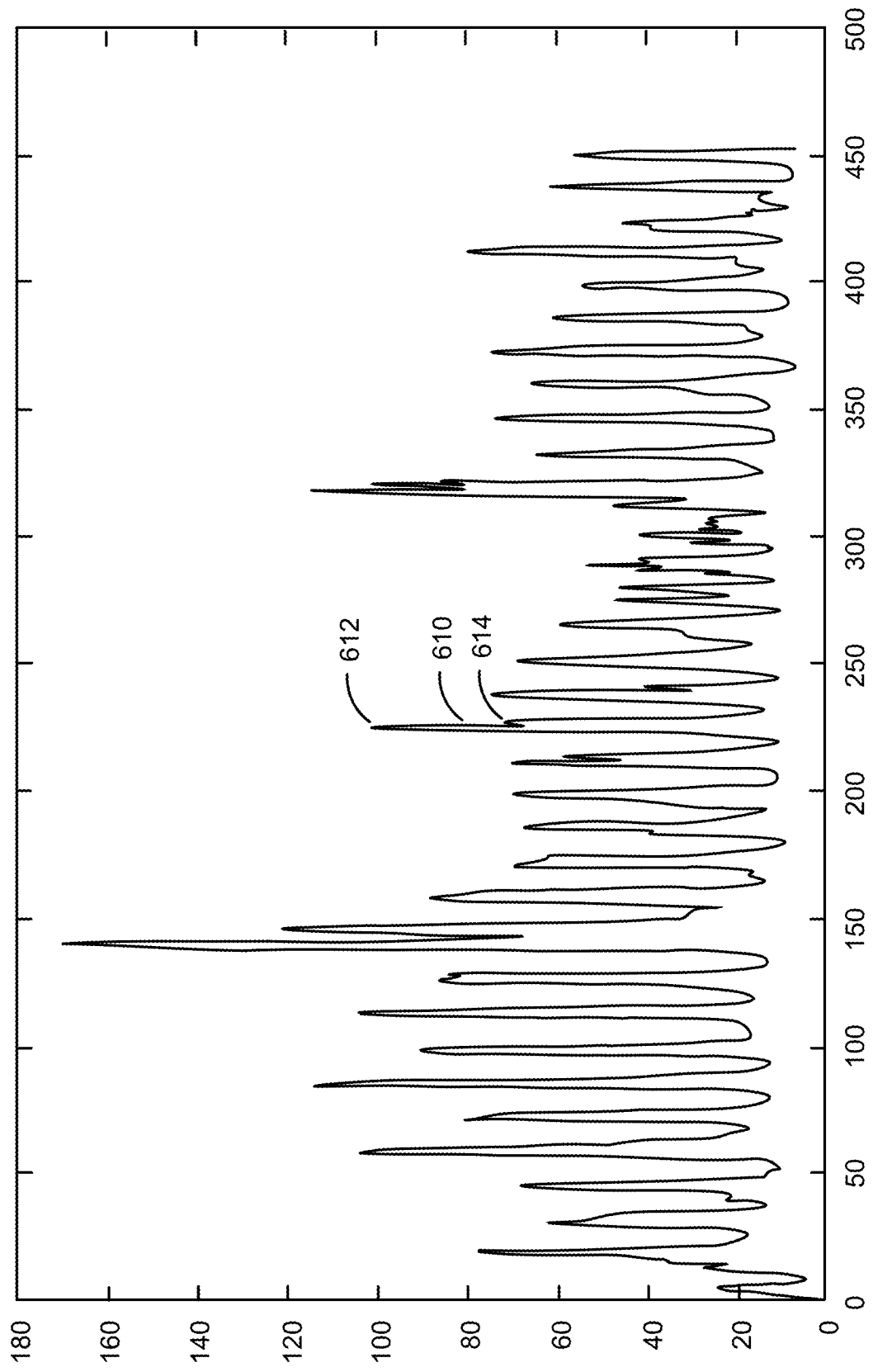
FIG. 6 is a chart showing an accumulated horizontal projection of the image shown in FIG. 5, according to one embodiment.

FIG. 6 is an example chart plotting hline value against line position for the image 200, according to one embodiment. As can be seen in FIG. 6, a row division threshold of approximately 40 will distinguish between peaks that correspond to divisions between rows and noise due to other features of the image 200. Using this approach, the row detection module 130 may automatically identify the divisions between rows with a relatively low amount of errors. In some instances, a peak (e.g., double peak 610) may have two or more distinct peaks within it (e.g., peaks 612 and 614). In one embodiment, the row detection module 130 addresses this by computing the median distance between peaks and then stepping through the peaks (e.g., top to bottom), accepting or rejecting each one. Once a peak (e.g., peak 612) has been accepted, the next peak (e.g., peak 614) is only accepted if it is more than a threshold proportion of the median distance from the preceding peak. As an example, the threshold proportion may be 80% of the median distance, but other proportions may be used.

In one embodiment, once the horizontal divisions have been identified from the peaks, the user may be presented the image 200 with the horizontal divisions highlighted and provided with a user interface to modify the positions of the divisions, add additional divisions, and/or remove divisions. This is described in greater detail below (but occurring later in the process), with reference to the user refinement module 190.

Referring again to FIG. 1, the image adjustment module 140 modifies the image 200 based on the divisions between rows of boards identified by the row detection module 130. In various embodiments, the image adjustment module 140 changes the size of the image so that the distance between pixels in the image 200 corresponds to a predetermined distance (e.g., in millimeters) in the real world. Assuming the thickness of the boards is known (e.g., provided by the user or determined from a tag on the bundle), the image may be resized automatically. In one such embodiment, the image adjustment module 140 determines the median distance between consecutive horizontal lines and automatically resizes the image to make that median value a predetermined number of pixels. Thus, the distance between pixels is normalized as corresponding a predetermined distance in the real world.

The vertical edge detection module 150 detects the separations between boards in the rows. In one embodiment, the vertical edge detection module 150 steps through each detected row of boards (e.g., the portion of the image 200 between each pair of adjacent hlines) and calculates a vline value for each column by accumulating the total edge response for each column of pixels in the portion of the image 200 corresponding to the row of boards.

Figure 7:
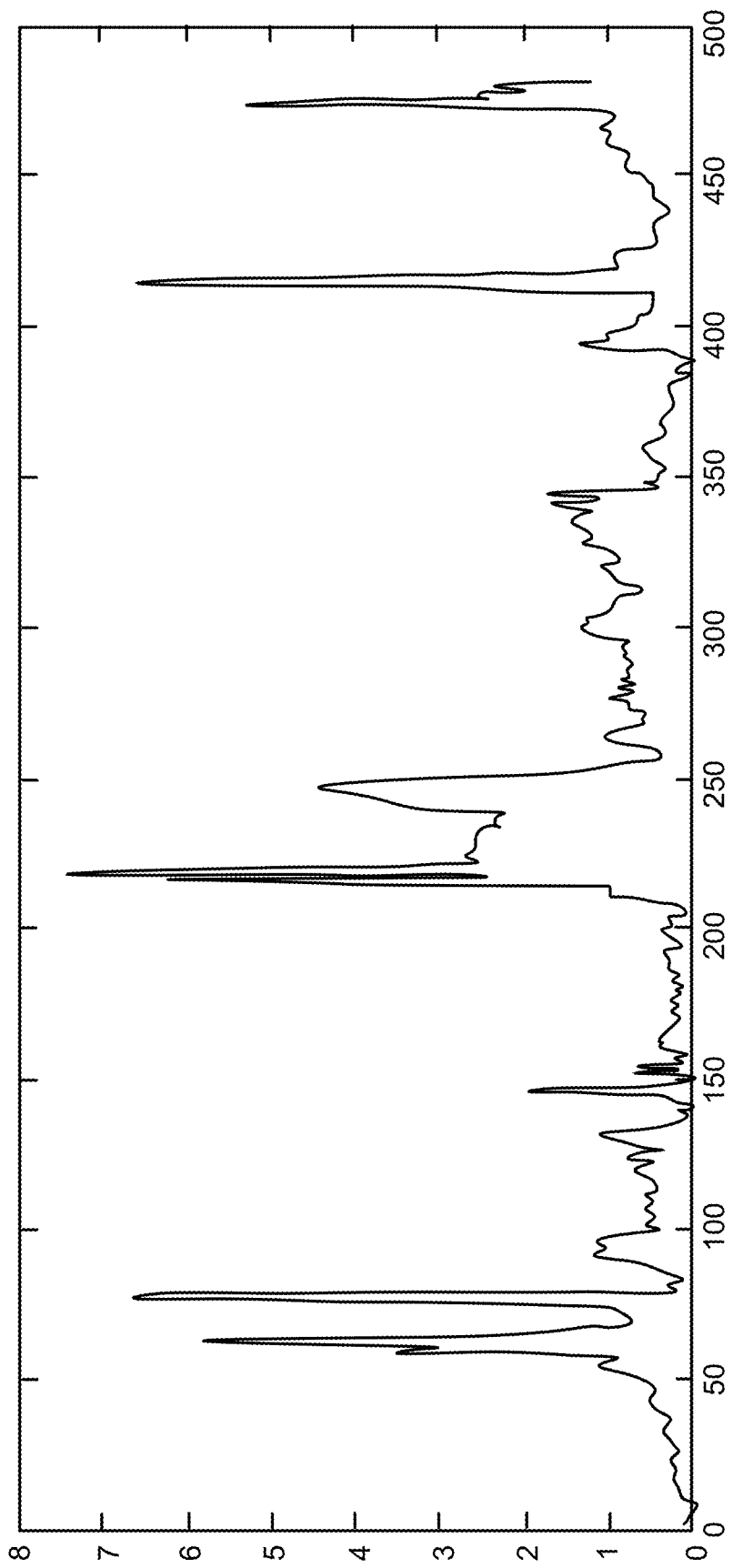
FIG. 7 is a chart showing an accumulated vertical projection for one row of the image shown in FIG. 5, according to one embodiment.

FIG. 7 is an example chart plotting vline value against column position for a row of boards, according to one embodiment. In particular, FIG. 7 shows the vline values for the row of boards between the second and third horizontal lines detected in image 200. Because the accumulation of vline values is for a row rather than all of image 200, the amount of noise may be significantly greater than for the hline values. Furthermore, the boards in the row may be of different widths and/or may have gaps between them, meaning that the vertical edge determination module 150 cannot always rely on an expected location of an edge.

In various embodiments, the vertical edge determination module 150 applies a Difference of Gaussians (DoG) filter with two different standard deviations to the hline values. A threshold is applied to the output from the DoG filter to identify peaks that correspond to vertical separators between potential boards. In one such embodiment, the threshold is automatically adapted by creating a histogram of the peaks and selecting the threshold that separates the histogram into two different sets (larger peaks and small peaks) while minimizing the variance in peak heights within each set. This approach is similar to the Otsu method used in grayscale image processing. The large peaks likely correspond to the real vertical spaces between boards while the small peaks likely correspond to noise and are ignored. In other embodiments, other image processing techniques are used to identify the vertical divisions between boards in each row.

Referring back to FIG. 1, the homography refinement module 160 refines the initial homographic transformation based on the identified horizontal and vertical lines. In one embodiment, a set of equally spaced (or approximately equally spaced) points along the edges previously identified (e.g., using the Sobel operator) are mapped to the closest point on one of the identified horizontal or vertical lines. The mappings between these pairs of points may be determined my finding the closest point on a horizontal or vertical line to each edge point in the two-dimensional Euclidean space of the image. The homography may be recalculated by minimizing the total distance between pairs (e.g., using a least squares method). This process may be repeated one or more times until convergence is found (e.g., total distance between pairs of points is less than a threshold).

In other embodiments, other processes may be used for refining the homography. For example, a non-rigid estimation method (e.g., a piecewise homography model) might be used to determine a refined homographic transformation that better fits the identified edges to the identified vertical and horizontal lines between boards. The handheld device 100 may repeat the processes of applying the (now refined) homographic transformation, detecting rows, and detecting the horizontal edges of boards within rows. This may be done a single time or the processes may continue to loop until the difference between one homographic transformation and the next iteration generated by the homographic refinement module 160 drops below a homographic refinement threshold. In some embodiments (e.g., where a reference shape is used, as described below, with reference to FIGS. 10-13), the homographic refinement module 160 is omitted and the initial homographic transformation is used.

The preliminary board identification module 170 receives the image 200 along with the identified horizontal and vertical lines. In various embodiments, the preliminary board identification module 170 generates a set of initial bounding boxes by identifying every possible rectangle created by a pair of adjacent horizontal lines and a pair of adjacent vertical lines. Each bounding box may correspond to a board, a gap between boards, or some other feature (e.g., an object obscuring some or all of a board or boards). In one embodiment, the vertical lines are ordered from left to right and grouped between adjacent horizontal lines. The bounding boxes are created based on an optimal threshold width. A box maybe rejected if its width is less than its height or greater than an upper threshold (e.g., 70%) of the total image width.

Figure 8:
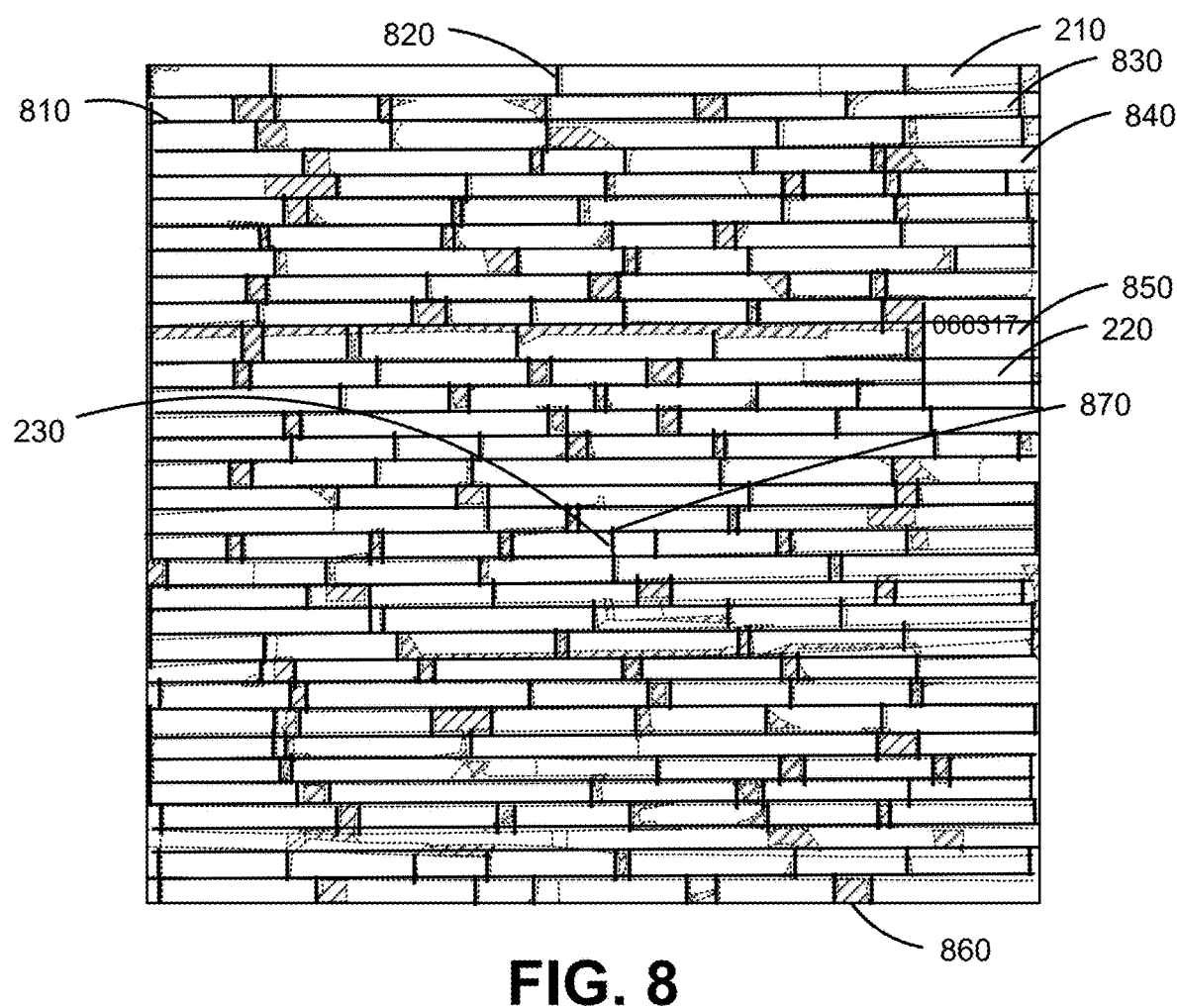
FIG. 8 is an illustrative representation of the image shown in FIG. 4 with the identified edges of boards highlighted, according to one embodiment.

FIG. 8 is an illustrative representation of the image 200 with the initial bounding boxes overlaid on the image. In the example shown in FIG. 8, the horizontal lines (e.g., line 810) and vertical lines (e.g., line 820) that define the bounding boxes are depicted as solid lines and the underlying image 200 is depicted using dotted lines. However, in practice, when the image 200 is presented to a user (e.g., by the user refinement module 290, described below) the lines may be overlaid over the underlying image 200 using any suitable approach. For example, the image 200 might be a color photograph presented unchanged (other than the cropping and homographic transformation) with vertical lines overlaid in one color (e.g., red) and vertical lines overlaid in another color (e.g., green).

In the example shown in FIG. 8, each bounding box in the set corresponds to a board, a gap between boards, or a non-board object (e.g., the identifying label 220). Note that the bounding boxes may not be perfect. For example, bounding box 830 does not fully encompass the corresponding board because the board may have a twist relative to the other boards in the bundle 210. As other examples, bounding box 840 encompasses both a board and a space between boards and bounding box 850 corresponds to the label 230, not a board (although there is likely a board that is obscured by the label). In one embodiment, a machine-learned algorithm (e.g., a neural network) or computer vision approach may be used to detect regions of the image and/or identify bounding boxes that correspond to occlusions (e.g., label 230). Alternatively or additionally, occlusions may be accounted for during the box merging and removal process (described below).

Figure 9:
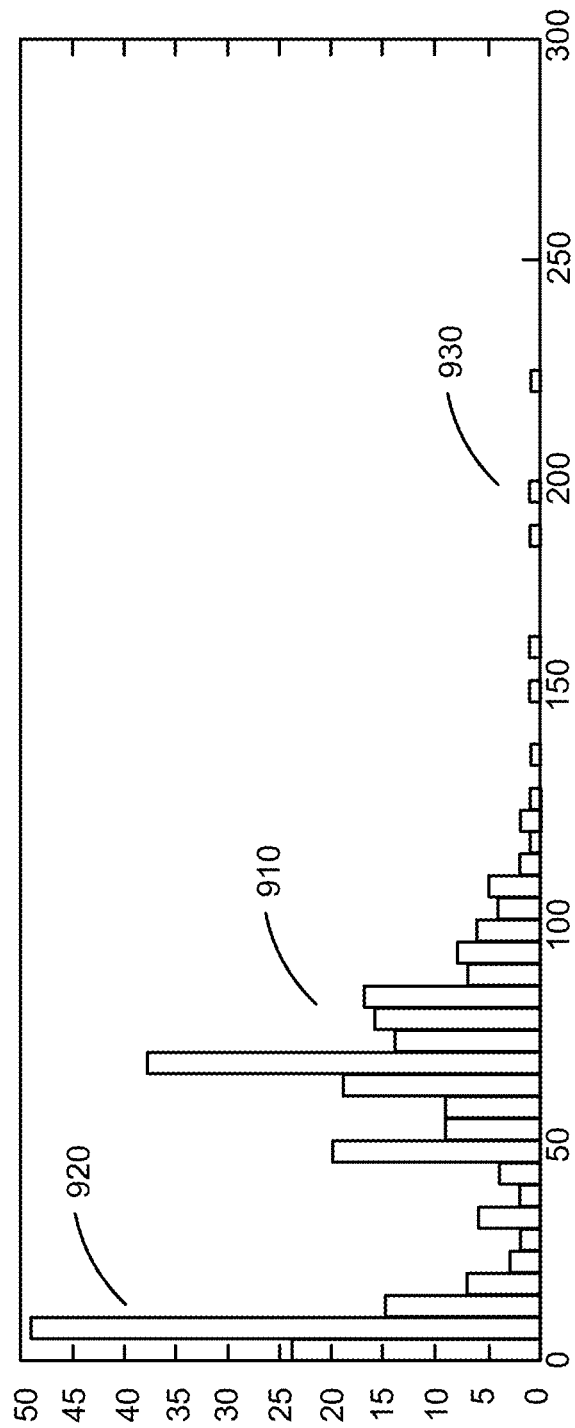
FIG. 9 is a histogram of identified box width for the bundles of boards shown in FIG. 2, according to one embodiment.

Referring once again to FIG. 1, the board refinement module 180 refines the bounding boxes to identify those that correspond to boards. The board refinement module 180 may also improve the position and/or size of the bounding boxes to better fit the corresponding board in the image. In various embodiments, the board refinement module 180 divides the bounding boxes into bins based on their size (e.g., height and/or width). FIG. 9 is a histogram showing the number of bounding boxes in each bin as extracted from image 200. The histogram includes an approximately normal distribution of bounding boxes 910 (centered around approximately 65) that likely correspond to complete boards. The histogram also indicates that there are many small bounding boxes 920 that likely do not correspond to complete boards and several very large bounding boxes 930 that likely correspond to more than one board or some other object or artifact. The board refinement module 180 may apply a pair of thresholds (e.g., set based on the Otsu method) to classify each bounding box as either small, normal, or large.

In various embodiments, the board refinement module 180 assumes that normal sized bounding boxes correspond to a single board. With regard to large bounding boxes, the board refinement module 180 may flag the box for further consideration (e.g., later presentation to a user for manual classification). The small bounding boxes may correspond to gaps between boards, a portion of a board that was erroneously divided into two or more bounding boxes, or some other object or artifact in the image 200.

In various embodiments, the board refinement module 180 loops one or more of the following processes until convergence is reached. Alternatively, a fixed or configurable number of iterations of the processes (e.g., three) may be used. In one such embodiment, the processes looped by board refinement module 180 include an initial box merge. Small boxes are merged with one of the neighboring boxes using a pair of thresholds. The first compares the L*A*B color space mean values of the bounding boxes and the second compares the RGB mean values, with the boxes being merged if the difference is less than the corresponding threshold.

The processes looped by board refinement module 180 may also include normalizing the bounding boxes to have a fixed height. In one embodiment, the board refinement module 180 uses the average distance between the horizontal lines identified by the row detection module 130 as an estimate of the height of the boards. The board refinement module 180 may then alter each bounding box to have the estimated height without altering its center of gravity. In other words, the position of the top edge and the bottom edge of a bounding box will be moved by the same amount, but in opposite directions.

The processes looped by board refinement module 180 may also include refining the heights of the bounding boxes. In one embodiment, the board refinement module 180 may move one or more boxes along the Y axis, while obtaining a maximum mean color value for each box, and constraining the degree to which boxes may overlap. This may better align the bounding boxes with the boards in the image, particularly where the boards in a row are not at exactly the same vertical position (e.g., due to twist).

The processes looped by board refinement module 180 may also include splitting large boxes into two or more smaller ones. In one embodiment, for each large bounding box, the board refinement module 180 may identify potential internal splits based on the edge map (e.g., potential vertical divisions that were previously rejected/filtered out). For example, starting with the strongest edge response (e.g., the most likely vertical division), then the second strongest, etc., the large box may be split into smaller boxes until either all resulting box widths are below a width threshold (e.g., the median width) or the next edge response is below a strength threshold.

The processes looped by board refinement module 180 may also include removing bounding boxes based on color of the encompassed pixels. In one embodiment, the board refinement module 180 analyzes the color distribution of pixels in each small bounding box and compares it to the average color of the normal sized bounding boxes. If the average difference between the color of the pixels in the small bounding box and the average color of the normal size bounding boxes exceeds a color distribution threshold, the board refinement module 180 determines that the small bounding box corresponds to a space between boards or another non-board feature and removes the bounding box. An average pixel intensity on a grayscale version of the image may also be used. For example, the bounding box 860 in FIG. 8 corresponds to a gap between boards and may be removed by the board refinement module 180. Alternatively, a machine-learned classifier (e.g., a convolution neural network) may be used that extracts features from the small bounding box and determines whether it corresponds to a board or a non-board region of the image. The bounding boxes corresponding to non-board regions are then removed.

The processes looped by board refinement module 180 may also include an additional box height refinement, similar to the previous height refinement. In one embodiment, the board refinement module 180 changes the heights and positions of boxes along the Y axis. For each bounding box, a set of three candidate boxes is generated by finding the maximum total edge value sum in the edge map (the sum of edge responses along the top and bottom borders of the box) in a range of +/−40% of the median height for: the top Y position of the box, the bottom Y position of the box, and both the top and bottom Y positions together. Each candidate may be assigned a score based on the total edge response value along its top and bottom borders. The candidates may then be ordered by score. Candidates may also be filtered out based on overlap with other boxes.

The processes looped by board refinement module 180 may also include refining the width of the bounding boxes. In one embodiment, the board refinement module 180 finds a position along the X axis for the first edge of a box (e.g., the left edge) within the range of +/−40% of the median width from its initial location where the edge map response is at a maximum. The edge of the bounding box may then be aligned with this maximum. The board refinement module 180 may apply the same process to a second edge of the box (e.g., the right edge). Thus, the width of the box may change if the edges are moved by different amounts.

The processes looped by board refinement module 180 may also include filling gaps by adding additional boxes. In one embodiment, the board refinement module 180 groups the existing bounding boxes into rows based on initially detected horizontal lines and current positions on the Y axis. If the gap between two consecutive boxes on the same row is greater than a threshold proportion of the media board width (e.g., 70%), and the mean color value is larger than a threshold (e.g., a threshold set by applying a machine-learned algorithm), the board refinement module 180 may add a new bounding box in the gap.

The processes looped by board refinement module 180 may also include merging consecutive boxes. In one embodiment, the board refinement module 180 considers the mean color value of the merged bounding box that would result from merging consecutive boxes and the total edge map value along their common border. If the mean color value is similar to other boards and the edge response along the common border is weak, the board refinement module 180 may merge the boxes. Conversely, if the mean color value is not very similar to other boards and the edge response along the common border is strong, the board refinement module 180 may not merge the boxes.

Alternatively or additionally, if the board refinement module 180 determines that a small bounding box corresponds to part of a board (e.g., based on mean color value), it may attempt to merge the small bounding box with one or more neighboring bounding boxes. In one embodiment, the board refinement module 180 calculates the combined area that would result from merging the small bounding box with each neighboring bounding box. The board refinement module 180 then selects the neighboring bounding box for which the combined area is closest to the median area of all bounding boxes that was calculated previously. For instance, in the example shown in FIG. 8, the board marking 230 has generated an erroneous vertical line 870 that divides a single board into two bounding boxes. However, assuming at least one of the resulting bounding boxes is classified as small, the board refinement module 180 may combine the pair because the combination is likely to be close to the median board width (because that combination does in fact correspond to a single board). In other embodiments, other processes for merging bounding boxes may be used.

In various embodiments, the board refinement module 180 also applies a machine-learned segmentation algorithm (e.g., a deep convolutional neural network) that identifies pixels that correspond to wood to further refine the bounding boxes. In one such embodiment, the board refinement module 180 applies the machine-learned algorithm to generate a segmentation map. Each box may have its position, width, and height adjusted based on the segmentation map. Consecutive boxes may be merged if the response on the segmentation map does not indicate an edge between the two boxes. Similarly, boxes may be split if the segmentation map indicates edges inside the map section corresponding to the bounding box. Furthermore, new boxes may be added if the mean value of the map between two existing boxes exceeds a threshold. Boxes may be discarded if the filling factor of the corresponding map section has a value below a threshold (e.g., 60%).

In one embodiment, each box has a corresponding connected component in the segmentation map. The board refinement module 180 may calculate the orientation of the connected component and adjust the angle of the corresponding bounding box accordingly. Thus, bounding boxes that are slanted may be obtained.

The user refinement module 190 provides a user interface (e.g., on a screen of the handheld device 100) with which the user can adjust the automatically determined locations of the horizontal lines, vertical lines, and/or bounding boxes. In one embodiment, the user refinement module 190 presents the user with the image 200 overlaid with the automatically located horizontal and vertical lines (e.g., as shown in FIG. 8). The user may delete lines (e.g., by clicking on them and pressing a delete button or dragging them to the side of the screen), move lines (e.g., by dragging them to a different position), resize lines (e.g., by dragging an end of the line to a different position), and/or add new lines (e.g., by tracing the new line with a pointer while holding down a button on a pointing device). One of skill in the art will recognize various ways in which the user interface may be configured to enable the user to adjust the lines.

In other embodiments, the user refinement module 190 may enable the user to adjust lines at other stages of the process. For example, the user may be able to adjust the position of the horizontal lines generated by the row detection module 130 before the vertical edge detection module 150 analyzes each row to identify vertical lines. Similarly, the user may be able to adjust the vertical lines before the preliminary board identification module 170 generates and analyzes the bounding boxes.

The data store 195 includes one or more computer readable media that are configured to store captured images and related metadata. The data store 195 may also store one or more machine-learned classifiers used by other modules of the handheld device 100. Furthermore, although the data store 195 is shown as being part of the handheld device 100, some or all of the data may be stored at a cloud storage facility accessed via a network (e.g., the internet).

Example Physical Reference Object for Aiding Homographic Transformation

Figure 10:
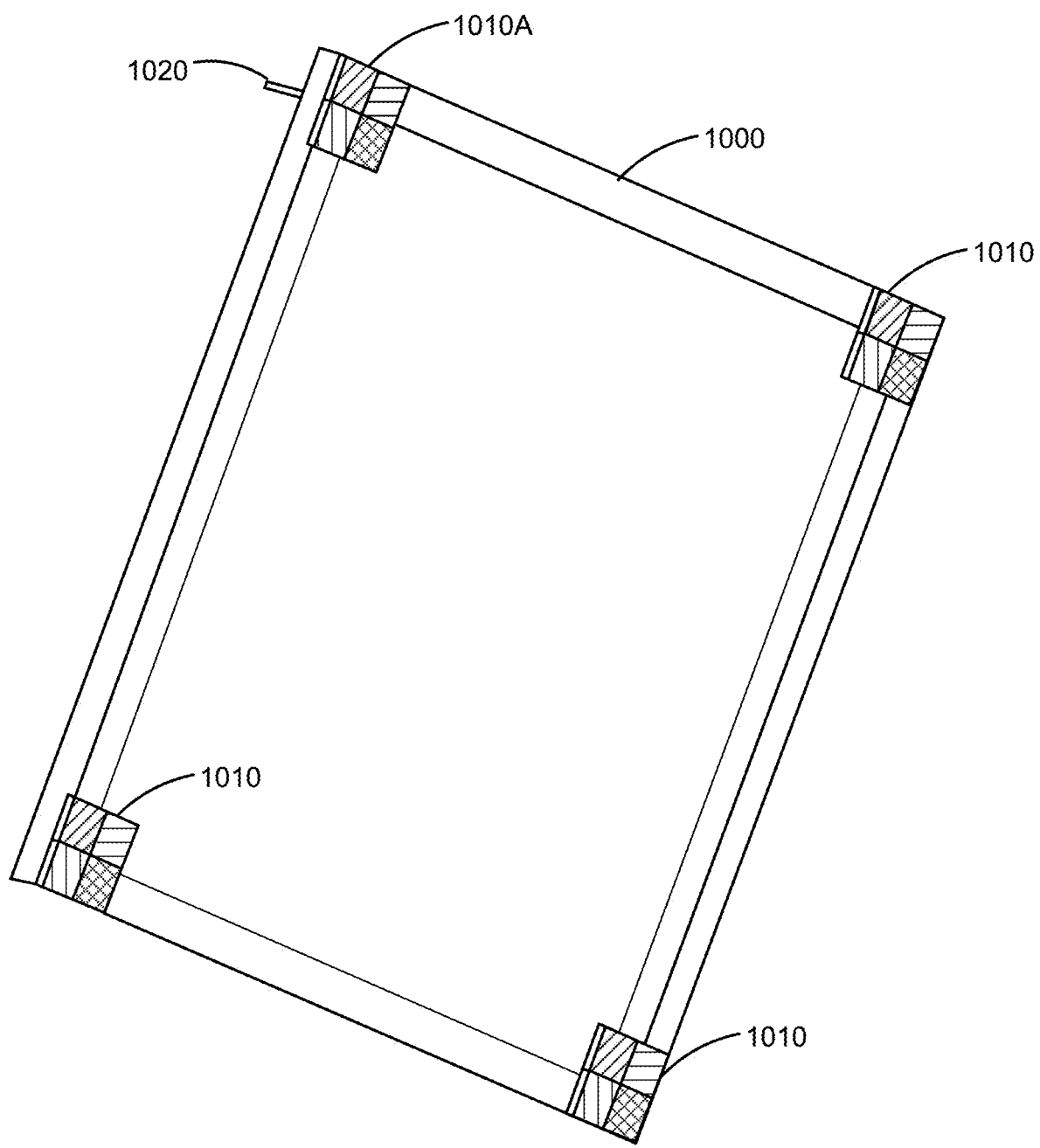
FIG. 10 is an illustration of a reference object used to assist in determining an appropriate homographic transformation, according to one embodiment.

In many scenarios, factors such as lens and perspective distortions may result in unacceptable errors when trying to determine with high precision the homographic transformation to apply. FIG. 10 shows one embodiment of a reference object 1000 used to assist in determining an appropriate homographic transformation. In the embodiment shown in FIG. 10, the reference object 1000 is a rhomboid frame with a label 1010 located at each corner. In one embodiment, each label 1010 includes four segments, each of a different color. The four labels 1010 in the corners of the reference object 1000 can be automatically detected by the handheld device 100. The inclusion of the four colors on the label 1010 makes it easier for the handheld device 100 to automatically detect the location of the corners. However, other patterns may be employed on the labels 1010 to enable reliable detection.

Regardless of the precise process used to identify the corners, four correspondences (one for each corner) can be found between the plane of an image containing the reference object 1000 and the true frontal perspective by comparing the image to a template (e.g., an image of the reference object from the true frontal perspective). Thus, the homographic transformation between the actual perspective of an image and the frontal perspective of the reference object 1000 can be automatically calculated from the detected labels 1010. In other words, use of the reference object 1000 obviates the need for a user to provide points for the basis of the homography (e.g., by selecting the four corners of a bundle of boards). Note that the user may still need to identify the area of the image that corresponds to the bundle of boards to be counted, but that this indication is not necessarily used to determine the homography.

Figure 11:
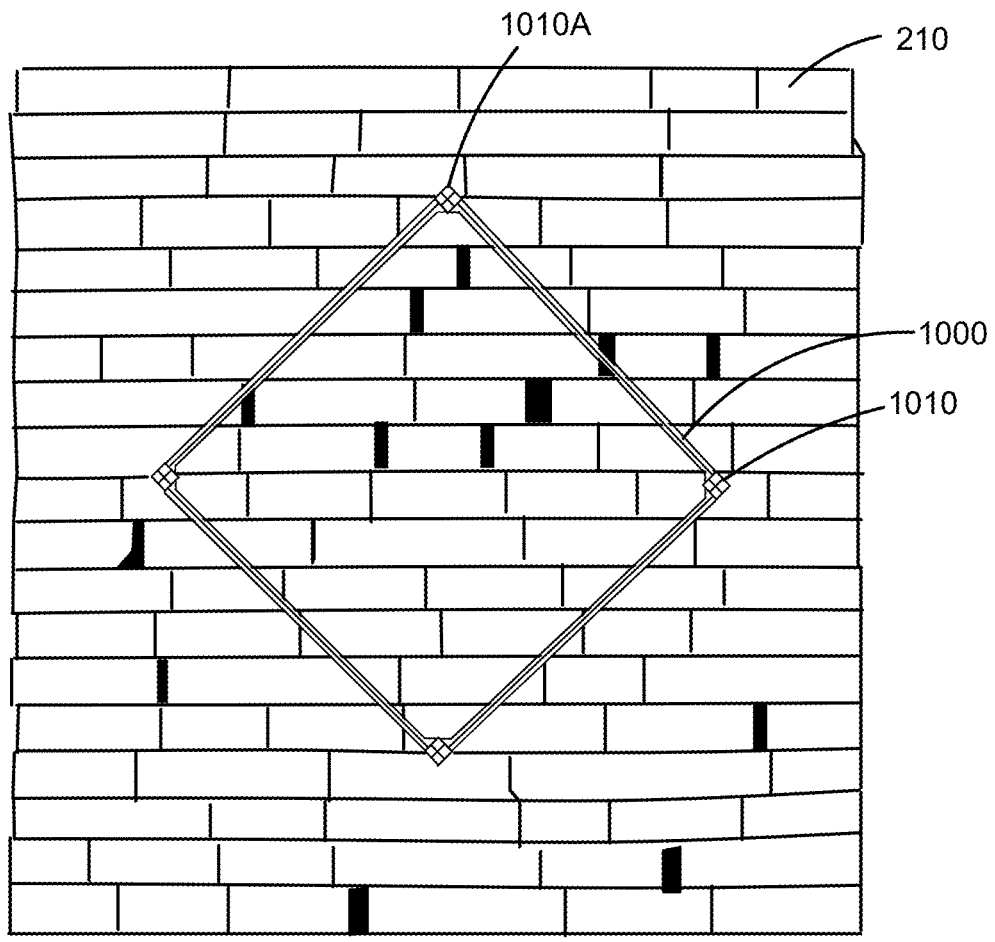
FIG. 11 is an image showing the reference object illustrated in FIG. 10 attached to a bundle of boards, according to one embodiment.

FIG. 11 shows the reference object 1000 attached to a bundle of boards 120, according to one embodiment. The reference object 1000 may be hung from the front surface of the bundle of boards 120 by a top corner 1010A. Thus, assuming the reference object 1000 is relatively free to move (other than being affixed by the top corner 1010A), it will hang in approximately the same orientation every time it is used.

In one embodiment, the reference object 1000 is placed in the middle of the bundle of boards 120 such that it is vertically and horizontally aligned as well as possible. If the reference the reference object 1000 is hung from a single connection point around which it can pivot (e.g., the top corner 1010A), gravity will vertically align the reference object (assuming the reference object is symmetric and balanced). The inclusion of the reference object 1000 in the image makes it easier to correct the perspective and other distortions. Based on the image, the appropriate homographic transform may be determined from the reference object 1000, the boards can be measured and, based on the reference object's known size, real-life dimensions can be computed.

In one embodiment, a linear classifier is learned using ridge regression over the three RGB channels that distinguish between the patterns in the corners 1010 of the reference object 1000. This classifier can then be applied to images to locate the corners of the reference object. The classifier may be applied at every image location (e.g., using a linear filtering approach). To obtain a response map. The response map may include a value for each pixel in the image, with higher values corresponding to pixels that are more likely to belong to one of the reference corners 1010.

Figure 12:
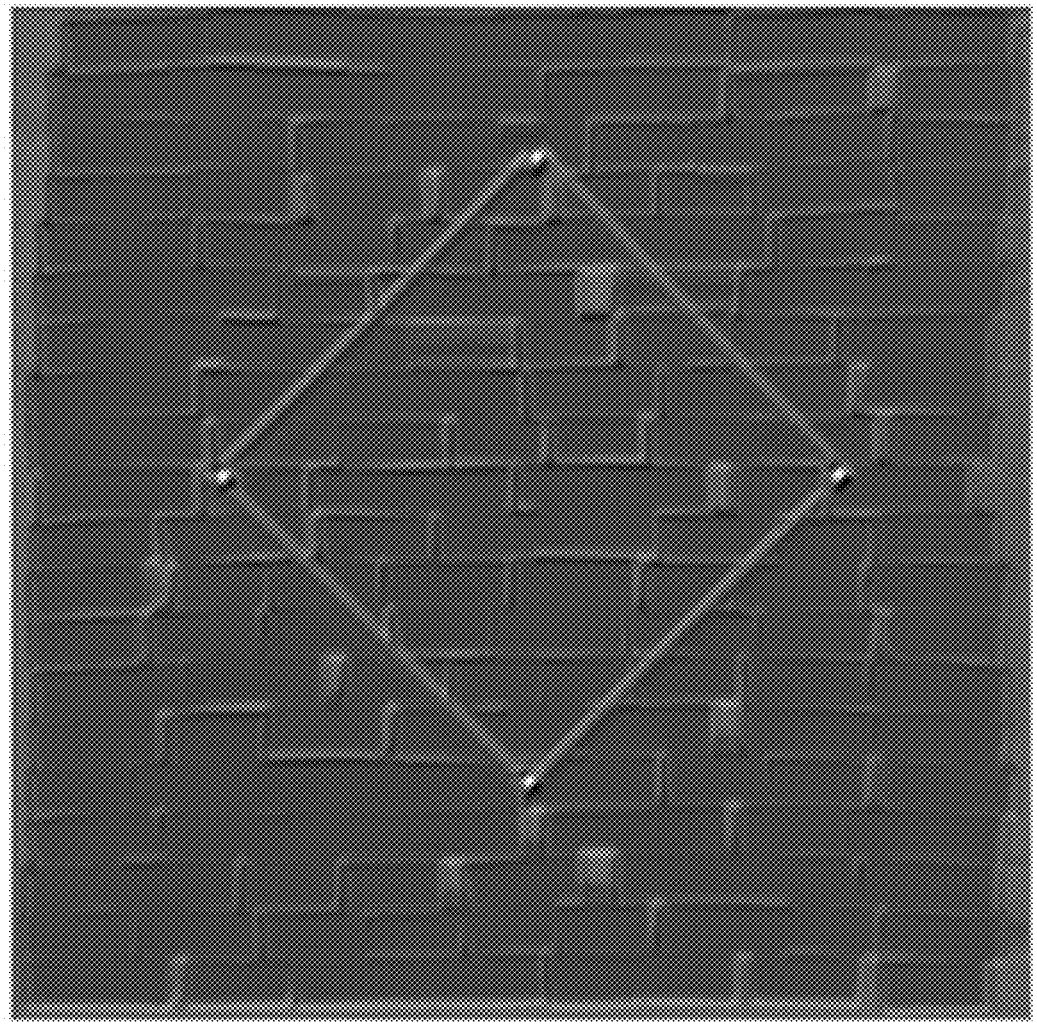
FIG. 12 is the image of FIG. 11 after the application of a response map operator configured to identify likely locations of the corners of the reference object, according to one embodiment.

FIG. 12 shows the image from FIG. 11 after the application of the linear classifier, according to one embodiment. In FIG. 12, higher response values are indicated by more intense pixels. It is immediately apparent to the human eye where the four corners 1010 are located. However, the four corners 1010 may be automatically located.

Figure 13:
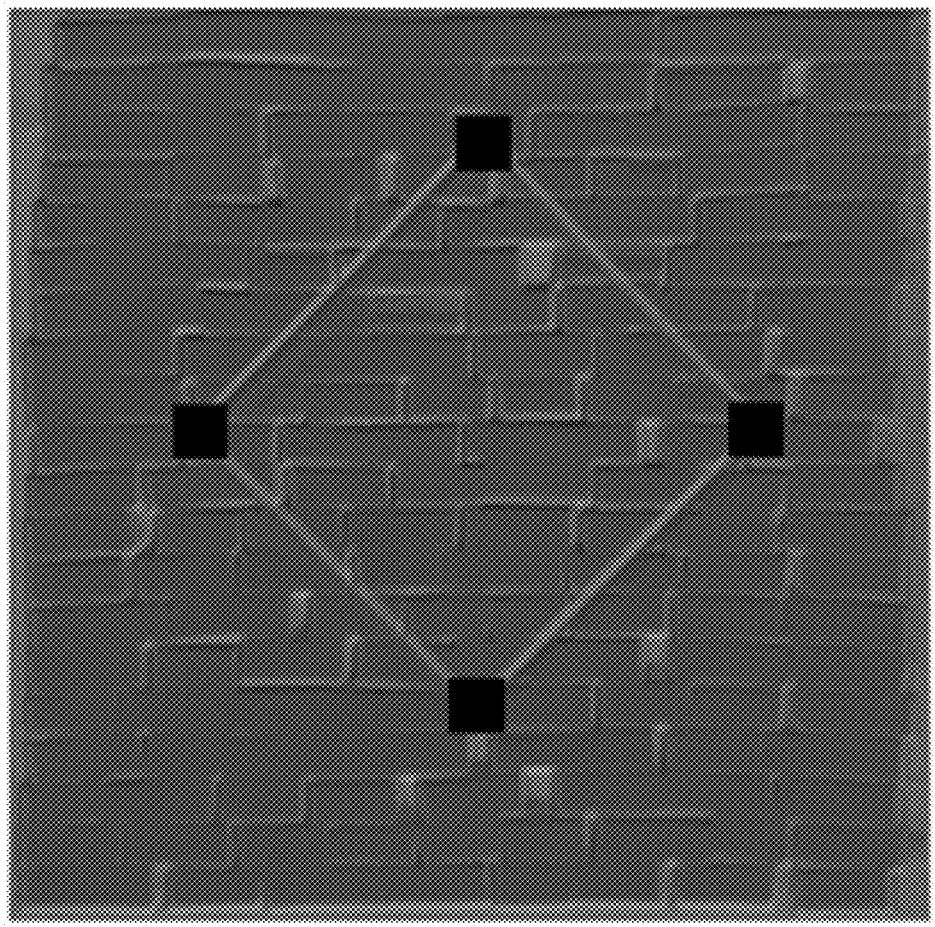
FIG. 13 is the image of FIG. 12 with after the corners of the reference object have been identified and removed, according to one embodiment.

In one embodiment, the handheld device 100 automatically locates the four corners 1010 with the following process. The handheld device assumes that the highest response pixel corresponds to one of the corners 1010. The surrounding pixels (e.g., all pixels within 10 pixels of the highest response pixel) are set to zero and then the next highest pixel response is found. This is assumed to be a second corner 1010, the surrounding pixels are set to zero, and the process repeats two more times until the four corners have been located. FIG. 13 shows an example of the image from FIG. 12 after the four corners 1010 have been located and the surrounding pixels set to zero.

As described above, the located corners may be used to determine the appropriate homography for the image. In one embodiment, four correspondences are found (one for each corner 1010) and the corresponding corner of a reference template. These four correspondences are sufficient for computing the homography between the image and the normalized template (e.g., by using the total least squares method). The homography matrix can then be used to transform the image, without the need for the user to indicate the location of each corner of the bundle 120 (although this may still be desirable for cropping purposes).

Once the image has been transformed using the determined homography, the exact mapping between pixels in the transformed image and real-life distances can be immediately estimated. By knowing the real-life size of the reference object 1000, the relationship between the number of pixels of the representation of the reference object in the image and the real-life size of the reference object is a simple mathematical function. The transformed image and/or mapping of pixels to real life dimensions can then be used by the handheld device 100 as part of the process for detecting, counting, and measuring the number of boards in the bundle 120.

Example Method for Detecting, Counting, and Measuring Boards

Figure 14:
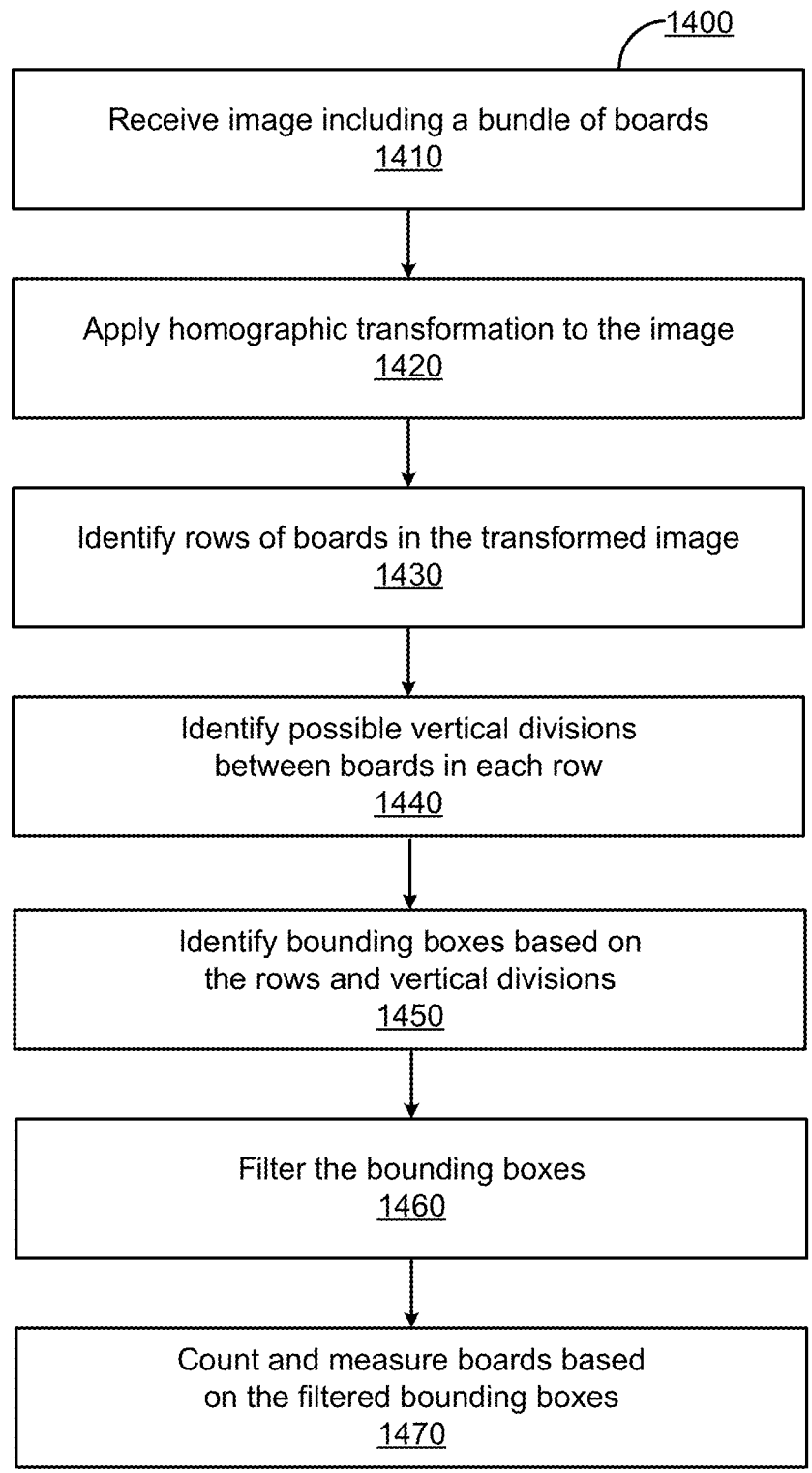
FIG. 14 is a flow chart illustrating a method for detecting, counting, and measuring boards from an image obtained with a handheld device, according to one embodiment.

FIG. 14 illustrates one embodiment of a method 1400 for detecting, measuring, and counting boards. The steps of FIG. 14 are illustrated from the perspective of the handheld device 100 performing the method 1400. However, some or all of the steps may be performed by other entities and/or components. In addition, some embodiments may perform the steps in parallel, perform the steps in different orders, or perform different steps. For example, in one embodiment, the handheld device 100 captures and image, transfers it to a server (not shown) over a network, and the server analyzes the image to detect, count, and measure the boards.

In the embodiment shown in FIG. 14, the method 1400 begins with the handheld device 100 receiving 1410 an image that includes a bundle of boards 120. The image may be received 1410 by capturing it (e.g., using a camera of the handheld device 100) or it may be provided by a different device (e.g., transmitted over a network from a separate camera).

The handheld device 100 applies 1420 a homographic transformation to the image to approximate the frontal view of the bundle of boards 120. In one embodiment, the handheld device prompts the user to identify the bundle of boards 120 and the handheld device 100 determines the homographic transformation based on the apparent shape of the bundle of boards in the image (based on the assumption that the bundle will be approximately rectangular in the frontal view). For example, the user might tap on each corner of the bundle 120 on a touchscreen and the handheld device 100 may then use these four points to calculate a homographic matrix. In another embodiment, a reference object (e.g., rhomboid reference object 1000) is used to automatically determine the homographic transformation to apply.

The handheld device 100 identifies 1430 rows of boards in the transformed image. In one embodiment, as described previously, the handheld device applies the Sobel operator to the image to identify edges and calculates a horizontal projection of the resulting image. Because the divisions between rows of boards should generate strong edge signals, the projection should have strong peaks for pixel rows corresponding to divisions between rows of boards. Thus, the position of the divisions between rows of boards can be identified 1430 from the projection (e.g., by applying a row division threshold to distinguish between peaks that arise from a row division and peaks caused by noise). In other embodiments, other approaches to identifying 1430 the divisions between rows of boards may be used.

The handheld device 100 identifies 1440 possible vertical divisions between boards for the identified rows of boards. In one embodiment, the handheld device 100 steps through the rows and calculates a vertical projection for each row. For similar reasons as described above for the horizontal projection, vertical divisions can be identified 1440 from peaks in the vertical projection. In other embodiments, other approaches to identifying 1440 possible vertical divisions may be used.

The handheld device 100 identifies 1450 a set of bounding boxes based on the identified rows and possible vertical divisions. In one embodiment, the set of bounding boxes includes every possible rectangle created by a pair of adjacent divisions between rows of boards (i.e., a row of boards) and a pair of adjacent possible vertical divisions in the row of boards.

The handheld device 100 filters 1460 the bounding boxes to identify those that correspond to boards. In one embodiment, as described previously with reference to FIG. 9, the handheld device filters out any bounding boxes with an area less than a minimum area threshold or above a maximum area threshold. The handheld device 100 may also attempt to combine small bounding boxes (e.g., those with an area less than the minimum area threshold) with adjacent bounding boxes under certain circumstances. For example, if the small bounding box has an average color that is similar to the average color of bounding boxes already determined to correspond to boards and can be joined with an adjacent bounding box to make a combined box with a total area between the minimum and maximum area thresholds, the handheld device 100 may combine the two boxes to create a single bounding box that meets the criteria of corresponding to a board. In other embodiments, other approaches may be used to filter 1460 and/or combine bounding boxes.

Additionally or alternatively, the bounding boxes may be presented to a user for verification and editing (not shown). The handheld device 100 may also refine the process by repeating some of the above steps or adding additional steps (not shown). For example, as described previously, the homography may be refined after the initial divisions between rows are determined. In the ideal case, the homography would result in all of the divisions between rows being straight, substantially parallel, and approximately equidistant. Thus, deviations from this ideal case can be corrected for with additional transformations based in these deviations.

The handheld device 100 counts and measures 1470 the boards based on the filtered bounding boxes. In one embodiment, each bounding box that survives the filtering 1460 corresponds to a board. Thus, the total number of boards in the bundle can be determined by counting the bounding boxes. Because the process involves determining a mapping between pixel size, the cross-sectional area of each board can be approximated from the corresponding bounding box. Thus, the handheld device 100 can count the number of boards and measure the size of each. From this information, other properties may be calculated. For example, if the type of material and length of the boards is known, the weight of the bundle can be approximated.

Example Machine Architecture

Figure 15:
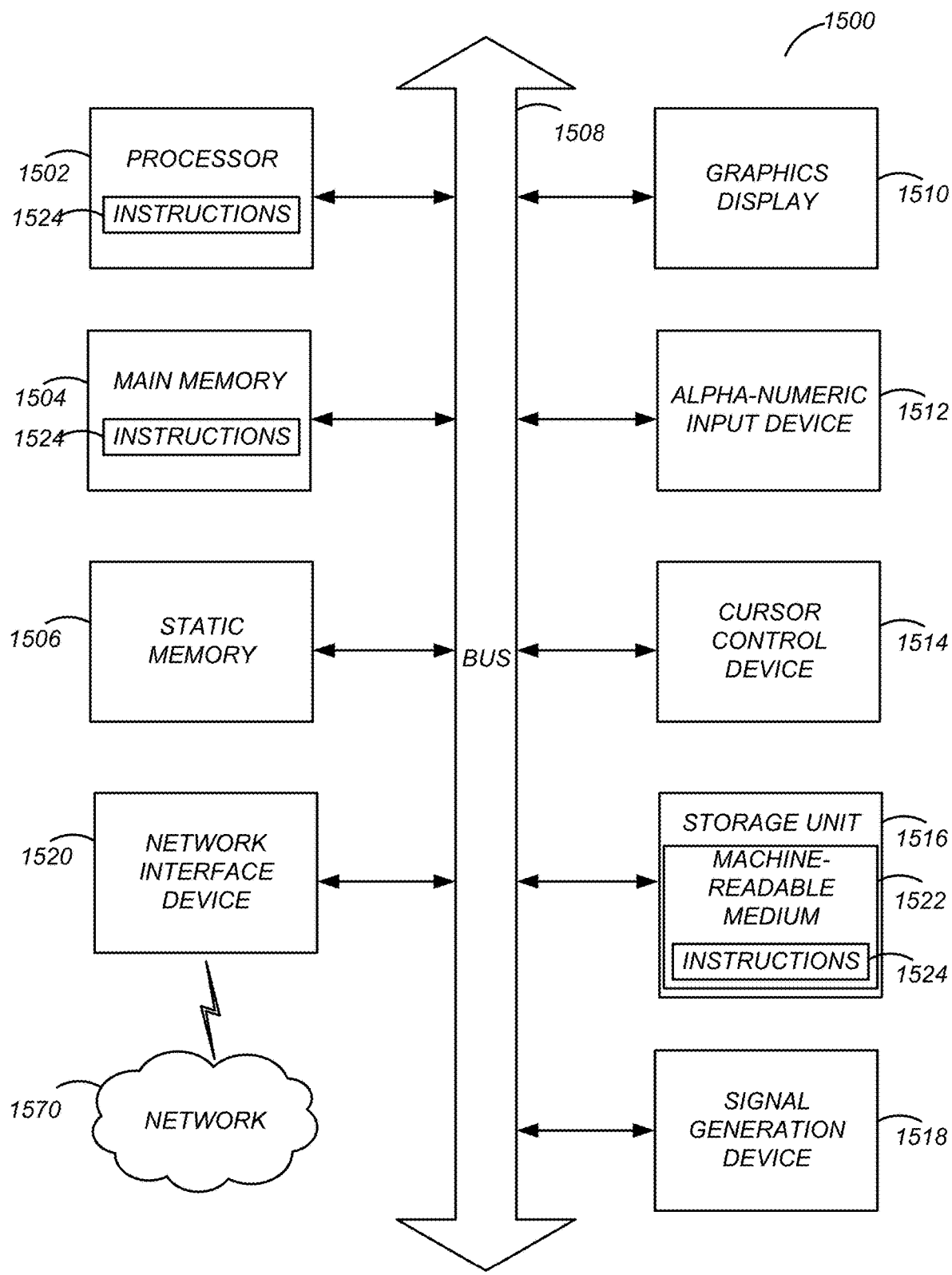
FIG. 15 is a block diagram illustrating components of an example machine able to read instructions from a machine-readable medium and execute them in a processor (or controller), according to one embodiment.

FIG. 15 is a block diagram illustrating components of an example machine able to read instructions from a machine-readable medium and execute them in a processor (or controller). Specifically, FIG. 15 shows a diagrammatic representation of a machine in the example form of a computer system 1500. All or portions of the computer system 1500 may be found in the handheld device 100. The computer system 1500 can be used to execute instructions 1524 (e.g., program code or software) for causing the machine to perform any one or more of the methodologies (or processes) described herein, including those associated, and described, with the components of the handheld device 100 of FIG. 1. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1524 (sequential or otherwise) that specify actions to be taken by that machine. Further, while only a single machine is illustrated, the term "machine" shall also be taken to include any collection of machines that individually or jointly execute instructions 1524 to perform any one or more of the methodologies discussed herein.

The example computer system 1500 includes one or more processing units (generally one or more processors 1502). The processor 1502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 1502 may refer to a single processor or multiple processors. The computer system 1500 also includes a main memory 1504. The computer system may include a storage unit 1516. The processor 1502, memory 1504, and the storage unit 1516 communicate via a bus 1508.

In addition, the computer system 1500 can include a static memory 1506, a display driver 1510 (e.g., to drive a plasma display panel (PDP), a liquid crystal display (LCD), or a projector). The computer system 1500 may also include alphanumeric input device 1512 (e.g., a keyboard), a cursor control device 1514 (e.g., a mouse, a trackball, a joystick, a motion sensor, or other pointing instrument), a signal generation device 1518 (e.g., a speaker), and a network interface device 1520, which also are configured to communicate via the bus 1508.

The storage unit 1516 includes a machine-readable medium 1522 on which is stored instructions 1524 (e.g., software) embodying any one or more of the methodologies or functions described herein. The instructions 1524 may also reside, completely or at least partially, within the main memory 1504 or within the processor 1502 (e.g., within a processor's cache memory) during execution thereof by the computer system 1500, the main memory 1504 and the processor 1502 also constituting machine-readable media. The instructions 1524 may be transmitted or received over a network 1570 via the network interface device 1520.

While machine-readable medium 1522 is shown in an example embodiment to be a single medium, the term "machine-readable medium" should be taken to include a single medium or multiple media (e.g., a centralized or distributed database, or associated caches and servers) able to store the instructions 1524. The term "machine-readable medium" shall also be taken to include any medium that is capable of storing instructions 1524 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The apparatus, methods, and computer program products as disclosed provide benefits and advantages that include the ability to count and/or measure the number of boards in a bundle using an image captured without requiring a highly-controlled capture environment. This may result in savings in time and money. For example, handheld devices are relatively inexpensive and readily available relative to existing automated board counting systems that use a fixed installation. Using a handheld (or at least readily mobile) device may also allow boards to be counted without spending time moving them to a counting machine and then to a storage location. Thus, the apparatus, methods, and computer program products provide improvements in computer vision, inventory management systems, image analysis, and other areas.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 through 14. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for automatically or semi-automatically counting boards in a bundle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for an image processing system to analyze a bundle of boards, the bundle of boards having a front face that is perpendicular to a long axis of boards in the bundle, the method comprising:
    receiving an image, a portion of the image depicting the bundle of boards, the image captured at an angle relative to the long axis of boards in the bundle;
    applying a homographic transformation to the image to estimate a frontal view of the front face, the frontal view being an appearance of the front face if viewed from a perspective parallel to the long axis of boards in the bundle;
    identifying a plurality of divisions between rows in the estimate of the frontal view;
    identifying a plurality of vertical divisions for each adjacent pair of the plurality of divisions between rows, identifying the plurality of vertical divisions comprising:
        generating a vertical projection from a row, the vertical projection comprising a plurality of peaks; and
        identifying a peak of the plurality of peaks as a vertical division responsive to a size of the peak exceeding a vertical division threshold;
    identifying a set of bounding boxes, each bounding box defined by a pair of adjacent divisions between rows and a pair of adjacent vertical divisions disposed between the pair of adjacent divisions between rows; and
    determining a number of boards in the bundle based on the set of bounding boxes.

2. The method of claim 1, wherein identifying the plurality of divisions between rows comprises:

generating a horizontal projection from the estimate of the frontal view, the horizontal projection comprising a plurality of peaks; and identifying a peak of the plurality of peaks as corresponding to a division between rows responsive to a size of the peak exceeding a horizontal division threshold.

3. The method of claim 1, wherein identifying the plurality of vertical divisions for the row further comprises:

generating a histogram of the plurality of peaks, the vertical division threshold dividing the plurality of peaks into two groups;

setting the vertical division threshold based on a total difference between each peak and other peaks in the same group.

4. The method of claim 1, further comprising filtering the set of bounding boxes, the filtering comprising:

identifying a bounding box with a total area less than a minimum area threshold; and removing the bounding box as corresponding to a gap between boards based on a color distribution of pixels encompassed by the bounding box.

5. The method of claim 1, further comprising:

identifying a bounding box with a total area less than a minimum area threshold;

calculating, for each of a plurality of adjacent bounding boxes, a total area of a merged bounding box that would result from merging the bounding box and the adjacent bounding box;

selecting one of the plurality of adjacent bounding boxes based on a comparison of the total areas and a median area of bounding boxes already determined to correspond to a board; and merging the bounding box with the selected adjacent bounding box.

6. The method of claim 1, further comprising:

determining a mapping between a size in pixels in the estimate of the frontal view and a physical size in the real world; and estimating a physical size of boards depicted in the estimate of the frontal view based on the mapping.

7. An image processing system configured to analyze a bundle of boards, the bundle of boards having a front face that is perpendicular to a long axis of boards in the bundle, the image processing system comprising:

a processor; and a non-transitory computer-readable media comprising stored instructions that, when executed, cause the processor to:

receive an image, a portion of the image depicting the bundle of boards, the image captured at an angle relative to the long axis of boards in the bundle;

apply a homographic transformation to the image to estimate a frontal view of the front face, the frontal view being an appearance of the front face if viewed from a perspective parallel to the long axis of boards in the bundle;

identify a plurality of divisions between rows in the estimate of the frontal view;

identify a plurality of vertical divisions for each adjacent pair of the plurality of divisions between rows, the instructions that cause the processor to identify the plurality of vertical divisions comprising instructions that cause the processor to:

generate a vertical projection from a row, the vertical projection comprising a plurality of peaks; and identify a peak of the plurality of peaks as a vertical division responsive to a size of the peak exceeding a vertical division threshold;

identify a set of bounding boxes, each bounding box defined by a pair of adjacent divisions between rows and a pair of adjacent vertical divisions disposed between the pair of adjacent divisions between rows; and determine a number of boards in the bundle based on the set of bounding boxes.

8. The image processing system of claim 7, wherein the instructions to identify the plurality of divisions between rows comprise instructions that cause the processor to:

generate a horizontal projection from the estimate of the frontal view, the horizontal projection comprising a plurality of peaks; and identify a peak of the plurality of peaks as corresponding to a division between rows responsive to a size of the peak exceeding a horizontal division threshold.

9. The image processing system of claim 7, wherein the instructions to identify the plurality of vertical divisions for a row further comprise instructions that cause the processor to:

generate a histogram of the plurality of peaks, the vertical division threshold dividing the plurality of peaks into two groups;

set the vertical division threshold based on a total difference between each peak and other peaks in the same group.

10. The image processing system of claim 7, wherein the instructions further comprise instructions that cause the processor to:

identify a bounding box with a total area less than a minimum area threshold; and remove the bounding box as corresponding to a gap between boards based on a color distribution of pixels encompassed by the bounding box.

11. The image processing system of claim 7, wherein the instructions further comprise instructions that cause the processor to:

identify a bounding box with a total area less than a minimum area threshold;

calculate, for each of a plurality of adjacent bounding boxes, a total area of a merged bounding box that would result from merging the bounding box and the adjacent bounding box;

select one of the plurality of adjacent bounding boxes based on a comparison of the total areas and a median area of bounding boxes already determined to correspond to a board; and merge the bounding box with the selected adjacent bounding box.

12. The image processing system of claim 7, wherein the instructions further comprise instructions that cause the processor to:

determine a mapping between a size in pixels in the estimate of the frontal view and a physical size in the real world; and estimate a physical size of boards depicted in the estimate of the frontal view based on the mapping.

13. A non-transitory computer-readable medium configured to store instructions, the instructions when executed by a processor causing the processor to:

receive an image, a portion of the image depicting a bundle of boards, the bundle of boards having a front face that is perpendicular to a long axis of boards in the bundle, the image captured at an angle relative to the long axis of boards in the bundle;

apply a homographic transformation to the image to estimate a frontal view of the front face, the frontal view being an appearance of the front face if viewed from a perspective parallel to the long axis of boards in the bundle;

identify a plurality of divisions between rows in the estimate of the frontal view;

identify a plurality of vertical divisions for each adjacent pair of the plurality of divisions between rows, the instructions that cause the processor to identify the plurality of vertical divisions comprising instructions that cause the processor to:

generate a vertical projection from a row, the vertical projection comprising a plurality of peaks; and identify a peak of the plurality of peaks as a vertical division responsive to a size of the peak exceeding a vertical division threshold;

identify a set of bounding boxes, each bounding box defined by a pair of adjacent divisions between rows and a pair of adjacent vertical divisions disposed between the pair of adjacent divisions between rows; and determine a number of boards in the bundle based on the set of bounding boxes.

14. The non-transitory computer readable medium of claim 13, wherein the instructions to identify the plurality of divisions between rows comprise instructions that cause the processor to:

generate a horizontal projection from the estimate of the frontal view, the horizontal projection comprising a plurality of peaks; and identify a peak of the plurality of peaks as corresponding to a division between rows responsive to a size of the peak exceeding a horizontal division threshold.

15. The non-transitory computer readable medium of claim 13, wherein the instructions to identify the plurality of vertical divisions for a row comprise instructions that cause the processor to:

generate a vertical projection from the row, the vertical projection comprising a plurality of peaks;

generate a histogram of the plurality of peaks, a vertical division threshold dividing the plurality of peaks into two groups;

set the vertical division threshold based on a total difference between each peak and other peaks in the same group; and identify a peak of the plurality of peaks as a vertical division responsive to a size of the peak exceeding the vertical division threshold.

16. The non-transitory computer readable medium of claim 13, wherein the instructions further comprise instructions that cause the processor to:

identify a bounding box with a total area less than a minimum area threshold; and remove the bounding box as corresponding to a gap between boards based on a color distribution of pixels encompassed by the bounding box.

17. The non-transitory computer readable medium of claim 13, wherein the instructions further comprise instructions that cause the processor to:

identify a bounding box with a total area less than a minimum area threshold;

calculate, for each of a plurality of adjacent bounding boxes, a total area of a merged bounding box that would result from merging the bounding box and the adjacent bounding box;

select one of the plurality of adjacent bounding boxes based on a comparison of the total areas and a median area of bounding boxes already determined to correspond to a board; and merge the bounding box with the selected adjacent bounding box.

18. The non-transitory computer readable medium of claim 13, wherein the instructions further comprise instructions that cause the processor to:

determine a mapping between a size in pixels in the estimate of the frontal view and a physical size in the real world; and estimate a physical size of boards depicted in the estimate of the frontal view based on the mapping.

19. The method of claim 1, further comprising refining the homographic transformation based on the identified plurality of divisions between rows and the identified plurality of vertical divisions.

20. The image processing system of claim 7, wherein the instructions further comprise instructions that cause the processor to refine the homographic transformation based on the identified plurality of divisions between rows and the identified plurality of vertical divisions.

* * * * *